United States Patent [19]

Hupf

[11] 3,996,846
[45] Dec. 14, 1976

[54] COFFEE MAKER WITH IMPROVED HOT WATER PUMP

[75] Inventor: Charles J. Hupf, Kewaskum, Wis.

[73] Assignee: Regal Ware, Inc., Kewaskum, Wis.

[22] Filed: Dec. 3, 1975

[21] Appl. No.: 637,254

[52] U.S. Cl. .............................. 99/307; 99/300; 99/310

[51] Int. Cl.² ................................ A47J 31/057

[58] Field of Search ........... 99/292, 280, 281, 282, 99/300, 306–307, 310, 311; 219/436, 441

[56] References Cited

UNITED STATES PATENTS

| | | | |
|---|---|---|---|
| 2,549,132 | 4/1951 | Robbiati | 99/307 |
| 2,756,667 | 7/1956 | Burns | 99/292 |
| 2,801,326 | 7/1957 | Sullivan | 219/436 |
| 2,846,938 | 8/1958 | Brandl | 99/281 |
| 3,358,583 | 12/1967 | Lepoix et al. | 99/307 |
| 3,384,004 | 5/1968 | Perlman et al. | 99/289 |
| 3,759,161 | 9/1973 | Anderson | 99/282 |
| 3,793,933 | 2/1974 | Weber | 99/283 |
| 3,844,206 | 10/1974 | Weber | 99/282 |
| 3,869,968 | 3/1975 | Ihlenfeld | 99/280 |
| 3,902,408 | 9/1975 | Fuhner | 99/307 |

Primary Examiner—Leonard D. Christian
Assistant Examiner—Arthur O. Henderson
Attorney, Agent, or Firm—Wheeler, Morsell, House & Fuller

[57] ABSTRACT

The hot water pump of a coffee maker includes a water heating chamber and heating means therefor, a vertical hot water lift tube which extends upwardly from the water heating chamber, a pair of check valve discs on the bottom portion of the vertical lift tube which cover the top of the water heating chamber, a horizontal hot water transfer conduit coupled to the top of the vertical lift tube and extending transversely over the coffee pot stand with an outlet for discharging the hot water into a coffee basket on top of a coffee pot, means for removably connecting the water transfer conduit to the coffee maker housing at a point intermediate the ends of the water transfer conduit, and spring means surrounding the vertical lift tube and bearing at the bottom end on the uppermost check valve disc or on a ridge on the tube and bearing at the top end on the end of the transfer conduit which is coupled to the vertical lift tube, thereby removably locking the water pump structure in a predetermined position within the coffee maker housing and sealing the check valve.

10 Claims, 4 Drawing Figures

COFFEE MAKER WITH IMPROVED HOT WATER PUMP

BACKGROUND OF THE INVENTION

This invention relates to coffee makers of the type having a water reservoir within the coffee maker housing and having means within the housing for heating water from the reservoir and pumping the hot water to a hot water discharge outlet for discharge into a drip type coffee basket above a coffee pot on the coffee pot stand. The invention is more particularly concerned with improvements in the hot water pump portions of such coffee makers.

Some prior art coffee makers of the above described type are disclosed in the following U.S. Pat. Nos.: 2,549,132; 2,881,692; 3,358,583; 3,384,004; 3,592,125; 3,759,161; 3,793,933; and 3,844,206.

SUMMARY OF THE INVENTION

The principal objects of this invention are to provide a coffee maker having an improved hot water pump portion that is easily removable and replaceable for cleaning; that is securely locked in position when in use but can be easily unlocked for removal; and which is simple in structure and does not require precision fit of parts. Other objects and advantages of the invention will be apparent from the description which follows.

The water pump of this invention includes a water heating chamber which is in fluid communication with the water reservoir of a coffee maker along with means for heating the water in the heating chamber to boiling temperature, a substantially vertical hot water lift tube extending upwardly from the water heating chamber on one side of the coffee pot stand, a check valve between the water heating chamber and the reservoir to permit entry of water into the heating chamber through the check valve and to prevent exit of water from the heating chamber through the check valve, whereby vapor pressure in the heating chamber will force hot water up the vertical hot water lift tube in periodic spurts, a substantially horizontal hot water transfer conduit coupled to the top of the vertical hot water lift tube and extending transversely therefrom over the coffee pot stand, a water outlet opening on the end of the transfer conduit above the coffee pot stand, means removably connecting the horizontal hot water transfer conduit to the coffee maker housing at a location intermediate the ends of the transfer conduit, and spring means surrounding the vertical hot water lift tube and bearing on the end of the horizontal hot water transfer conduit which is coupled to the vertical hot water lift tube for applying pressure to the removable connection between the horizontal hot water transfer conduit which is coupled to the vertical hot water lift tube for applying pressure to the removable connection between the horizontal hot water transfer conduit and the housing to removably lock the transfer conduit to the housing. The check valve is preferably attached to the vertical hot water lift tube and the spring means preferably bears against the check valve seat to press it against the open end of the heating chamber to prevent exit of water therefrom through the check valve.

DESCRIPTION OF THE PREFERRED EMBODIMENT

Figure 1:
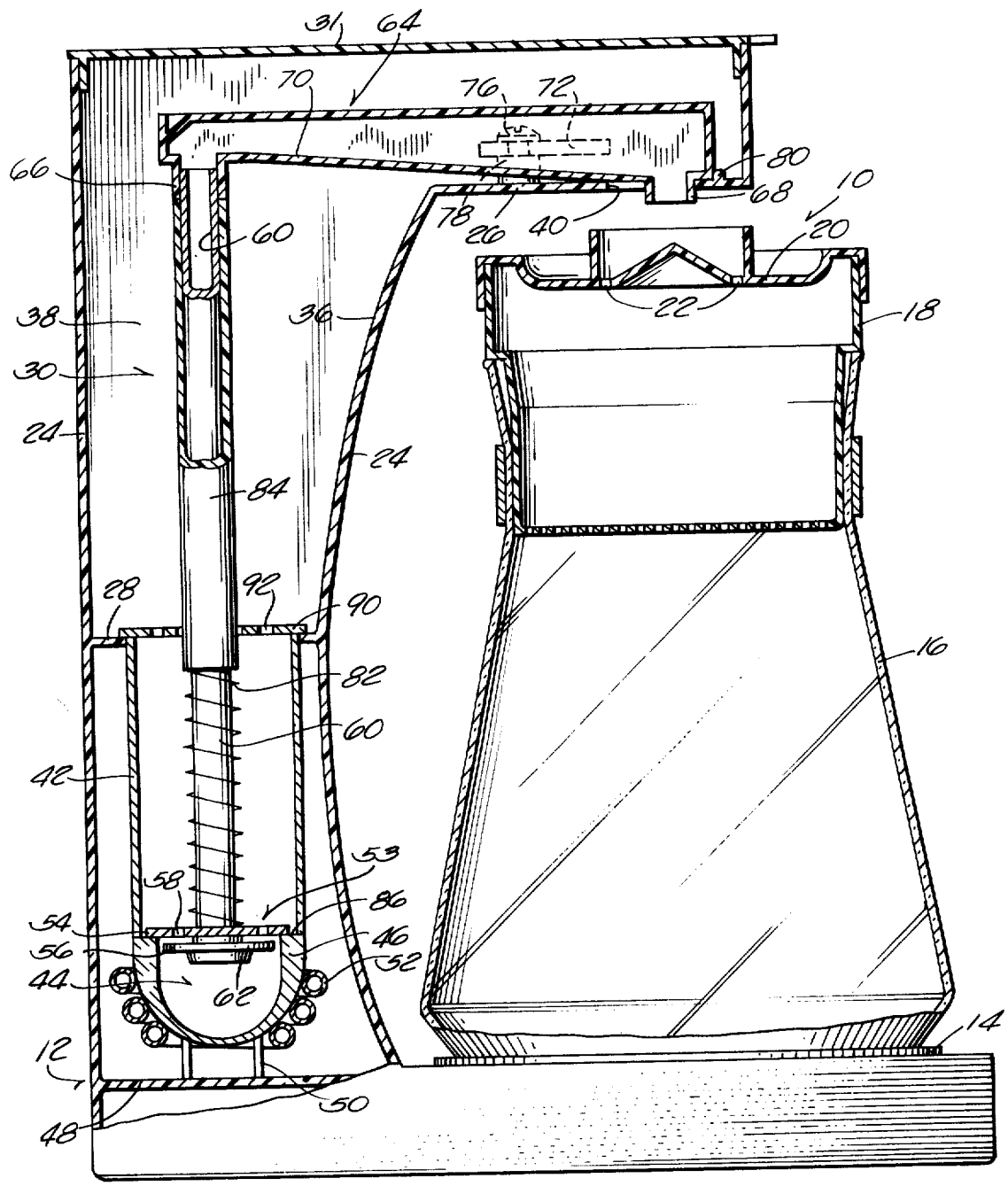
FIG. 1 is a side cross-sectional view of a coffee maker taken on line 1—1 of FIG. 2 utilizing the hot water pump of this invention, showing portions of the base in side elevational view.
Figure 2:
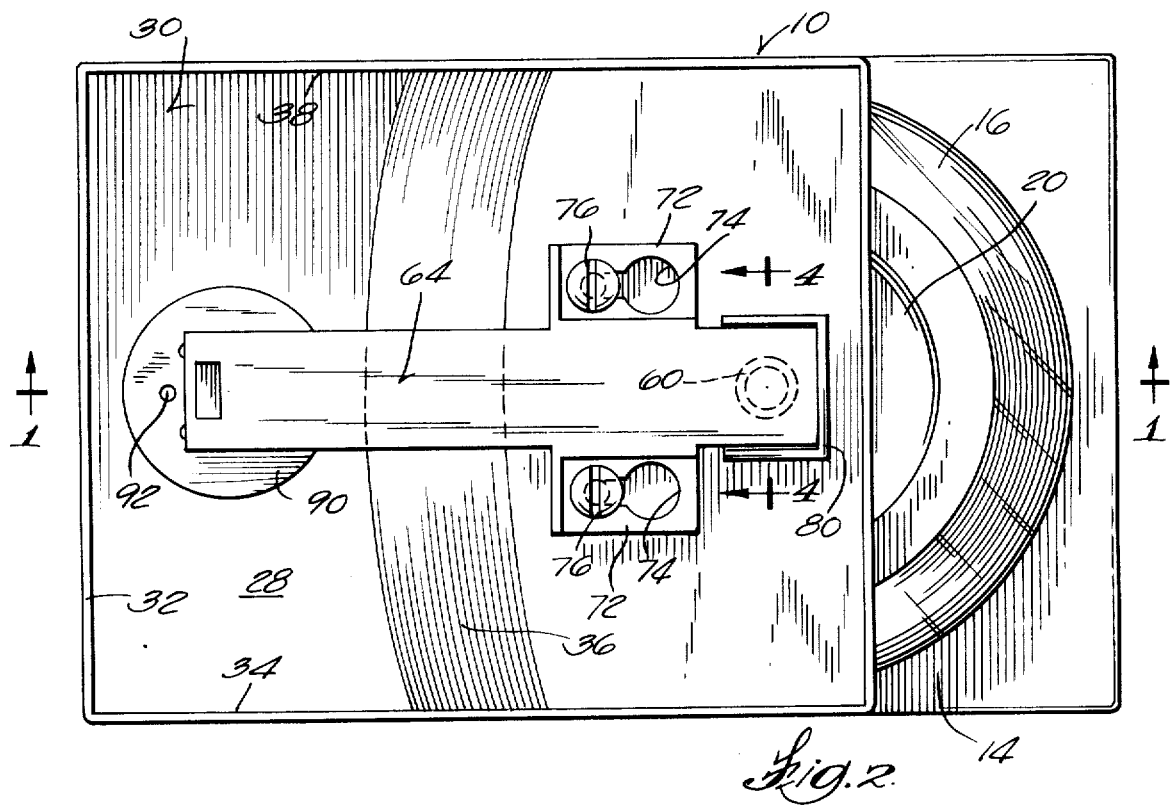
FIG. 2 is a plan view shown with cover 31 removed.
Figure 3:
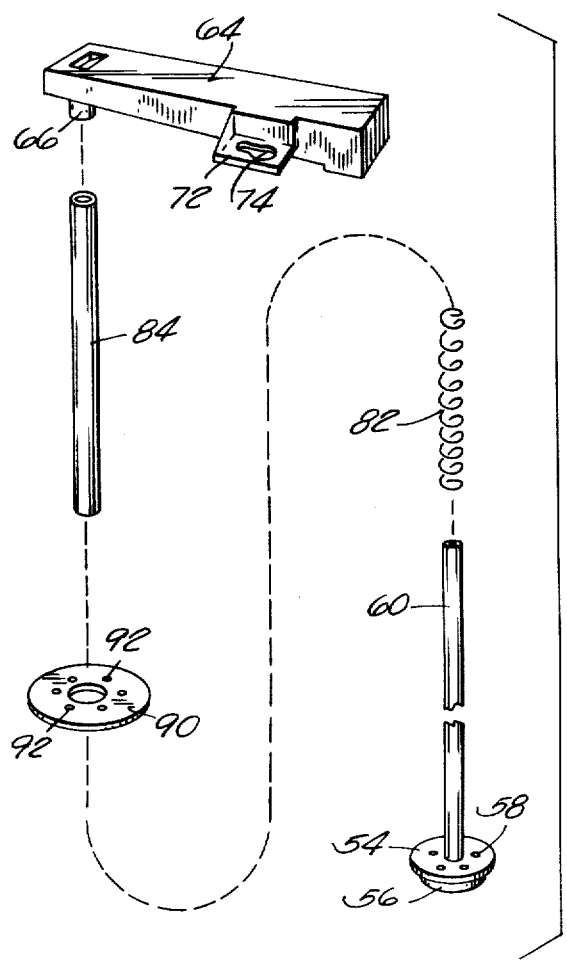
FIG. 3 is an exploded perspective view of the principal parts of the hot water pump shown in FIGS. 1 and 2.

FIG. 1 and 2 show a coffee maker 10 which includes a molded plastic housing 12 which supports a flat coffee pot stand 14 which in turn supports a conventional coffee carafe 16 with a drip type coffee basket 18 on top of coffee pot 16, so design that the water spreader for basket 18 also is a lid for carafe 16. The top 20 of coffee basket 18 has openings 22 in the central portion thereof for receiving hot water as described hereinafter. Housing 12 has an upstanding portion 25 which rises upwardly above coffee basket 18 at one side thereof and has a transversely extending portion 26 which extends over the center of coffee basket 18. Housing 12 has a horizontal dividing plate 28 extending across the central portion thereof. Dividing plate 28 can be molded integrally with the upstanding portion 24 of housing 12 and forms the bottom of a water reservoir 30 whose side walls are formed by the sides 32, 34 36, and 38 (FIG. 2) of upstanding housing portion 24. Sides 32, 34, and 38 are flat while side 36 is curved. All of the sides 32 - 38 are joined to dividing plate 28 by preferably integral water tight joints to form a water tight reservoir. The water level in reservoir 30 is always below the bottom of transversely extending housing portion 26 so that no water can escape through the opening 40 therein through which hot water is dropped on the top 20 of coffee basket 18 as described hereinafter. Water reservoir 30 is open at the top and is closed by a removable top plate 31 which can be manually removed to pour water into reservoir 30.

A cylindrical aluminum well, sump, or vertical passageway 42 extends downwardly from a circular opening in dividing plate 28 in fluid communication with a cup-shaped heating chamber 44 formed by an aluminum cup 46 which is supported by brackets 48 and 50 in the inner portion of housing 12. Brackets 48 and 50 can be integrally molded with housing 12. Heating chamber cup 46 is heated by a heating coil 52 which is schematically shown surrounding cup 46 but may be cast into the wall of the cup. Coil 52 receives electrical energy from a conventional electrical source, not shown, and heats the water in heating chamber 44 to its boiling point. Another heating element, not shown, is preferably conventionally mounted under coffee pot stand 14 to keep the coffee in coffee pot 16 warm.

A check valve 53 comprising a perforated valve seat disc 54 and a movable valve disc 56 which is large enough to block the openings 58 in valve seat disc 54 is attached to the bottom end of a hollow aluminum tube 60 which serves as a vertical hot water lift tube. Valve seat disc 54 is rigidly attached to tube 60 near its lower end and extends radially therefrom. Valve disc 56 is slidable on the bottom of tube 60 between a lowermost position, shown in FIG. 1, in which valve disc 56 abuts an enlarged bottom flange 62 on the lowermost portion of tube 60, and an uppermost position, not shown, in which valve disc 56 abuts the bottom of valve seat disc 54 and closes openings 58 to prevent exit of water therethrough from heating chamber 44. Valve disc 56 is normally gravity biased in its lower or open position and is closed when a bubble of stem forms in heating chamber 44. The steam bubble of bubble exerts an upward pressure which lifts valve disc 56 against valve seat disc 54 against the force of gravity and thus closes openings 58. The vapor pressure then forces hot water in heating chamber 44 up open hot water lift tube 60.

A horizontal hot water transfer conduit 64 is coupled to the top of hot water lift tube 60 by means of a cylindrical inlet port 66 forming an inlet opening whose inside diameter is of such size to slidably fit over the outside diameter of hot water lift tube 60. Hot water transfer conduit 64 is made of plastic, and has a cylindrical outlet port 68 forming an outlet opening on its opposite end which extends through opening 40 in housing portion 26 above the center of coffee basket 18. The bottom 70 of conduit 64 is sloped downwardly from the inlet end at the left hand side in FIG. 1 to the outlet end at the right hand side in FIG. 1.

In the operation of this embodiment, water is initially introduced into heating chamber 44 through opening 58 in check valve seat disc 54, and is then heated to boiling by heating element 52. As steam forms in heating chamber 44, it forces the hot water therein upwardly, which closes check valve disc 56 and thus routes the hot water upwardly through open hot water lift tube 60 and into the inlet port 66 of transfer conduit 64. The hot water then flows down sloping surface 70 to outlet port 68, where it falls down onto the conical baffle top 20 of coffee basket 18, and thence through openings 22 onto the coffee in coffee basket 18. After a spurt of hot water has been forced up hot water lift tube 60, the vapor pressure within heating chamber 44 falls below the level needed to maintain check valve 53 closed, at which time check valve disc 56 drops and admits cool water into heating chamber 44 through openings 58 in check valve seat disc 56. The water in heating chamber 44 then heats to boiling again and forces another spurt of hot water up lift tube 60, this percolation cycle being repeated continuously as long as there is cool water in the passageway 42 above check valve 53. Thus, heating chamber 44, check valve 53, heating coil 52, lift tube 60, and transfer conduit 64 act as a hot water pump which pumps hot water in periodic spurts from heating chamber 44 to outlet port 68.

Figure 4:
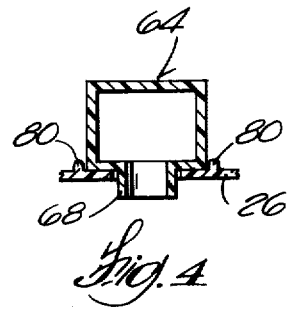
FIG. 4 is a detailed cross-sectional view taken on the line 4—4 of FIG. 2.

Hot water transfer conduit 64 is removably connected to housing portion 26 by a pair of flanges 72 provided with keyhole slots 74 (FIG. 2) which flanges project laterally from opposite sides of conduit 64 and engage a pair of headed studs 76 projecting upwardly from posts or bosses 78 (FIG. 1) that extend upwardly from housing portion 26 on opposite sides of transfer conduit 64 under keyhole slots 74. It is important that flanges 72 are removably locked to housing portion 26 by upward pressure on inlet port 66, which pressure forces the margins of flanges 72 around keyhole slots 74 upward against the bottom of headed studs 76 and forces the margins of conduit 64 around outlet port 68 downward on the margin of opening 40 in housing portion 26. A C-shaped abutment ridge 80 (FIGS. 2 & 4) is formed in the bottom of housing portion 26 around the outlet end of transfer conduit 64 to correctly center outlet port 68 both laterally and longitudinally above coffee basket 18.

The upward pressure on inlet port 66 of transfer conduit 64 is generated by spring means which includes a stainless steel compression spring 82 (FIG. 1) pushing endwise on a plastic sleeve 84, both of which surround hot water lift tube 60 and are slidable thereover. The lower end of spring 82 bears downwardly on check valve seat disc 53 and presses disc 53 against the upper edge 86 of heating chamber cup 46 and this acts to seat check valve disc 53. The upper end of spring 82 bears upwardly on sleeve 84 which in turn bears on the lower margin of inlet port 66 of transfer conduit 64 to lock conduit 64 to headed studs 76 as described above and position the transfer conduit in ridge 80.

The above described hot water pump can be easily removed by first removing top 31, grasping transfer conduit 64 an sliding conduit 64 to the left in FIGS. 1 or 2 to disengage keyhole slots 74 from headed studs 76. Transfer conduit 64 can then be easily lifted out, as can tube 60, sleeve 84, spring 82, and check valve 53. If desired, a perforated aluminum cover disc 90 with openings 92 formed therein can be used loosely fitted over sleeve 84 to cover the top of vertical passageway 42, and this cover disc 90 will lift out with hot water lift tube 60 by engagement with check valve seat disc 54.

The above described hot water pump parts can be replaced almost as easily as they are removed and can be easily locked in place by simply pressing down on the inlet end of transfer conduit 64 (the left hand end in FIGS. 1 and 2) to compress spring 82 while sliding conduit 64 to the right in FIGS. 1 and 2 to engage the margins of flanges 72 around keyhole slots 74 under headed studs 76 up to the limit defined by abutment 80, which centers conduit 64 both laterally and longitudinally. The pressure spring 82 then holds transfer conduit 64 removably locked to housing portion 26 in an accurately centered location while also sealing check valve seat disc 54 against the top edge of heating chamber cup 46.

I claim:

1. In a coffee maker having a housing, a coffee pot stand supported by a portion of said housing, and a water reservoir formed by a portion of said housing, an improved hot water pump comprising means forming a water heating chamber within said housing, means coupling said water heating chamber to said water reservoir, means for heating the water in said water heating chamber to the boiling temperature thereof, a substantially vertical hot water lift tube extending upwardly from said water heating chamber on one side of said coffee pot stand, a check valve between said water reservoir and said heating chamber to permit entry of water into said heating chamber through said check valve and to prevent exit of water from said heating chamber through said check valve, whereby vapor pressure in said water heating chamber will force hot water up said vertical hot water lift tube in periodic spurts, a substantially horizontal hot water transfer conduit coupled to the top of said hot water lift tube and extending transversely therefrom over said coffee pot stand for conveying said hot water to a location above said coffee pot stand, a water outlet opening on the end of said transfer conduit above said coffee pot stand, means removably connecting said transfer conduit to said housing at a location intermediate the ends of said transfer conduit, and spring means surrounding said vertical hot water lift tube and bearing on the end of said horizontal hot water transfer conduit which is coupled to said vertical hot water lift tube for applying pressure to the removable connection between said transfer conduit and said housing to removably lock said transfer conduit to said housing.

2. The hot water pump defined in claim 1 wherein said check valve is connected to the lower portion of said vertical hot water lift tube, and wherein said means forming a water heating chamber has an upper edge upon which a portion of said check valve rests, and wherein the lower portion of said spring bears against a portion of said check valve to press said check valve portion against said upper edge of said means forming a water heating chamber.

3. The hot water pump defined in claim 1 wherein said means removably connecting said transfer conduit comprises a pair of keyhole slotted flanges extending transversely from opposite side edges of said transfer conduit and means on said housing for removably engaging said keyhole slotted flanges.

4. The hot water pump defined in claim 3 wherein said means on said housing for removably engaging said keyhole slotted flanges comprises a pair of upstanding headed studs on a portion of said housing, said headed studs being positioned to engage said keyhole slotted flanges and removably connect said transfer conduit to said housing in a predetermined position.

5. The hot water pump defined in claim 1 wherein said transfer conduit has an inlet opening at one end thereof and an outlet opening at the other end thereof, the bottom of said transfer conduit being normally sloped downwardly from the inlet end thereof to the outlet end thereof to permit hot water to flow under the influence of gravity from said inlet end to said outlet end.

6. The hot water pump defined in claim 1 wherein said transfer conduit has an inlet port on one end thereof, the inside diameter of said inlet port being slightly larger than the outside diameter of said hot water lift tube to slidably receive the same.

7. The hot water pump defined in claim 1 wherein said spring means includes a compression spring surrounding the lower portion of said hot water lift tube and a rigid sleeve surrounding the upper portion of said hot water lift tube and slidable thereon, the upper end of said spring bearing against the lower end of said sleeve, and the upper end of said sleeve bearing against the lower end of said inlet port.

8. The hot water pump defined in claim 7 wherein said check valve comprises a perforated check valve seat disc rigidly connected to the bottom portion of said hot water lift and a check valve disc slidably connected to said lift tube below said check valve seat disc, and wherein the bottom of said spring bears on the top of said check valve seat disc.

9. The hot water pump defined in claim 8 wherein said means forming a water heating chamber has an upper edge upon which a portion of said check valve seat disc rests, whereby said spring presses said check valve seat disc against said upper edge of said means forming a water heating chamber.

10. The hot water pump defined in claim 1 and further comprising an abutment on a portion of said housing adjacent to the outlet and of said transfer conduit, said abutment being positioned to engage the outlet end of said transfer conduit and to center said transfer conduit both laterally and longitudinally.

* * * * *